(12) United States Patent
Woodmansey et al.

(10) Patent No.: US 7,155,410 B1
(45) Date of Patent: Dec. 26, 2006

(54) SYSTEMS AND METHODS FOR LINKING ORDERS IN ELECTRONIC TRADING SYSTEMS

(76) Inventors: Robert J. Woodmansey, "Kippings" Church Lane, Doddinghurst, Nr. Blackmore Essex CM15 ONA (GB); Philip M. Ginsberg, 25 Broad St. Penthouse C., New York, NY (US) 10004; Glenn D. Kirwin, 55 Fayette Rd., Scarsdale, NY (US) 10583

( * ) Notice: Subject to any disclaimer, the term of this patent is extended or adjusted under 35 U.S.C. 154(b) by 144 days.

(21) Appl. No.: 09/627,705

(22) Filed: Jul. 28, 2000

Related U.S. Application Data

(60) Provisional application No. 60/146,971, filed on Aug. 3, 1999.

(51) Int. Cl.
*G06Q 40/00* (2006.01)

(52) U.S. Cl. .......................... 705/37; 705/35

(58) Field of Classification Search .............. 705/37, 705/36, 35; 427/37
See application file for complete search history.

(56) References Cited

U.S. PATENT DOCUMENTS

| | | | |
|---|---|---|---|
| 3,573,747 A | 4/1971 | Adams et al. ........... 340/172.5 |
| 4,903,201 A | 2/1990 | Wagner | |
| 5,077,665 A | 12/1991 | Silverman et al. ............ 705/37 |
| 5,161,103 A | 11/1992 | Kosaka et al. ................ 705/36 |
| 5,297,031 A | 3/1994 | Gutterman et al. ........... 705/37 |
| 5,500,793 A | 3/1996 | Deming, Jr. et al. ......... 705/37 |
| 5,717,989 A | 2/1998 | Tozzoli et al. | |
| 5,727,165 A | 3/1998 | Ordish et al. ................. 705/37 |
| 5,787,402 A * | 7/1998 | Potter et al. .................. 705/37 |
| 5,809,483 A * | 9/1998 | Broka .......................... 705/37 |
| 5,845,266 A * | 12/1998 | Lupien et al. ............ 705/36 R |
| 5,857,176 A * | 1/1999 | Ginsberg ...................... 705/36 |
| 5,905,974 A | 5/1999 | Fraser et al. .................. 705/37 |
| 5,924,082 A | 7/1999 | Silverman et al. ............ 705/37 |
| 5,950,176 A | 9/1999 | Keiser et al. ................. 705/37 |
| 6,134,535 A | 10/2000 | Belzberg ...................... 705/37 |
| 6,343,278 B1 * | 1/2002 | Jain ............................. 705/37 |
| 6,408,282 B1 * | 6/2002 | Buist ........................... 705/37 |

(Continued)

FOREIGN PATENT DOCUMENTS

EP  0401203  12/1990

(Continued)

*Primary Examiner*—Alain L. Bashore
(74) *Attorney, Agent, or Firm*—Cantor Fitzgerald, L.P., Innovation Division; Antonio Papageorgiou

(57) ABSTRACT

Systems and methods for linking orders in electronic trading systems are provided. These systems and methods enable a trader to select two or more items that are to be linked and specify linking parameters for those items. Any desired set of items may be linked, and the linking parameters may include price adjustments, order sequencing instructions, automatic/manual execution controls, execution delays commands, and update frequency limits. Upon detecting a bid or offer for a linked item, the systems and methods may then determine a size and a price for each linked item based upon the size and the price of the bid or offer for the first linked item. In this way, the sizes and the prices for the other linked items may be propagated from the size and the price for the first item. Once the size and the price for each item is determined, the systems and methods may submit orders for the items in accordance with the linking parameters. In the case where orders for linked items may only be submitted in designated lot sizes, the systems and methods may round the sizes of the orders to the designated lot sizes, and then submit remainder orders to make up for the rounding.

53 Claims, 7 Drawing Sheets

U.S. PATENT DOCUMENTS

| | | | |
|---|---|---|---|
| 6,418,419 B1 * | 7/2002 | Nieboer et al. | 705/37 |
| 6,519,574 B1 * | 2/2003 | Wilton et al. | 705/35 |

FOREIGN PATENT DOCUMENTS

| | | |
|---|---|---|
| EP | 0 873 549 | 10/1998 |
| EP | 0 873 549 B1 | 10/1998 |
| GB | 2365185 | 2/2002 |
| WO | WO 98/28900 | 7/1998 |
| WO | WO 98/49639 | 11/1998 |
| WO | WO 99/26173 | 5/1999 |
| WO | WO 99/27476 | 6/1999 |
| WO | WO 99/46658 | 9/1999 |
| WO | WO 00/03342 | 1/2000 |
| WO | WO 00/08578 | 2/2000 |
| WO | WO 00/21013 | 4/2000 |
| WO | WO 00/39719 | 7/2000 |

* cited by examiner

|  | Direct | Cash | CBOT 8% | CX 8% | CX 6% |
|---|---|---|---|---|---|
| Basis | X | X | -- | -- | X |
| Spreads | X | X | -- | -- | -- |

FIG. 4

SYSTEMS AND METHODS FOR LINKING ORDERS IN ELECTRONIC TRADING SYSTEMS

CROSS REFERENCE TO RELATED APPLICATION

This application claims the benefit of U.S. Provisional Patent Application No. 60/146,971, filed Aug. 3, 1999, entitled AUTOMATED LINKED ORDER PROCESSOR, which is hereby incorporated by reference herein in its entirety.

BACKGROUND OF THE INVENTION

The present invention relates to systems and methods for linking orders in electronic trading systems. More particularly, the present invention relates to systems and methods which enable traders to link trading of goods, services, financial instruments, and commodities in electronic trading systems.

In recent years, electronic trading systems have gained wide spread acceptance for trading of a wide variety of goods, services, financial instruments, and commodities. For example, electronic trading systems have been created which facilitate the trading of financial instruments and commodities such as stocks, bonds, currency, futures, oil, gold, pork bellies, etc. As another example, online auctions on the Internet have become popular markets for the exchange of services and both new and used goods. In one embodiment of systems for electronic trading of financial instruments, for example, a first trader may submit a "bid" to buy a particular number of 30 Year U.S. Treasury bonds at a given price. In response to such a bid, a second trader may submit a "hit" in response to the bid in order to indicate a willingness to sell bonds to the first trader at the given price. Alternatively, the second trader may submit an "offer" to sell the particular number of the bonds at the given price, and then the first trader may submit a "take" or "lift" in response to the offer to indicate a willingness to buy bonds from the second trader at the given price. In such trading systems, the bid, the offer, the hit, and the take (or lift) are collectively know as "orders". Thus, when a trader submits a bid, the trader is said to be submitting an order.

Modern day trading includes not only the buying and selling of a single type of item, but also more complex transactions involving exchanges of a combination of the same or different types of items. For example, in a typical spread transaction, one bond may be sold and another bond may be purchased as part of a single transaction. The trading of combinations of items in this way facilitates arbitrage, hedging, and speculation.

However, because such combinations of items may have very complex relationships, there is a need to automate the trading of combinations of items. Thus, it is an object of the present invention to provide systems and methods for linking orders in electronic trading systems.

SUMMARY OF THE INVENTION

In accordance with this and other objects of the invention, systems and methods for linking orders in electronic trading systems are provided. Preferred systems and methods in accordance with the present invention enable a trader to select two or more items that are to be linked and specify linking parameters for those items. Any desired set of items may be linked, and the linking parameters may include price adjustments, order sequencing instructions, automatic/manual execution controls, execution delays commands, and update frequency limits. Upon detecting a bid or offer for a linked item, the systems and methods may then determine a size and a price for each linked item based upon the size and the price of the bid or offer for the first linked item. In this way, the sizes and the prices for the other linked items may be propagated from the size and the price for the first item. Once the size and the price for each item is determined, the systems and methods may submit orders for the items in accordance with the linking parameters. In the case where orders for linked items may only be submitted in designated lot sizes, the systems and methods may round the sizes of the orders to the designated lot sizes, and then submit remainder orders to make up for the rounding.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which:

FIG. 4 is an illustration of an item selection display in accordance with one embodiment of the present invention.

DETAILED DESCRIPTION OF THE INVENTION

As stated above, the present invention provides systems and methods for linking orders in electronic trading systems. More particularly, the present invention provides systems and methods that enable traders to link two or more items for trading and specify parameters for controlling placement of orders for those items, and that automatically monitor bids and offers placed for those items, generate sizes and prices for orders related to those items, and place the corresponding orders for those items.

Although the present invention is described herein as being used by "traders," it should be apparent that the term "trader" is meant to broadly apply to any user of a trading system, whether that user is an agent acting on behalf of a principal, a principal, an individual, a legal entity (such as a corporation), etc., or any machine or mechanism that is capable of placing and/or responding to orders in a trading system.

Preferred embodiments of the systems and methods of the present invention are now described in greater detail in connection with FIGS. 1–6. In the examples which follow, trading of U.S. Treasury bonds, notes, and bond futures contracts, and their derivatives (e.g., spreads and basis), are used to illustrate various aspects of the present invention. Trading of these instruments is typically accomplished at a given price for a given size.

Notwithstanding that the present invention is illustrated with respect to trading of bonds, notes, and bond futures, and their derivatives, it should be noted that the systems and methods of the present invention are equally applicable to the trading of any type of goods, services, financial instruments, commodities, etc.

Figure 1:
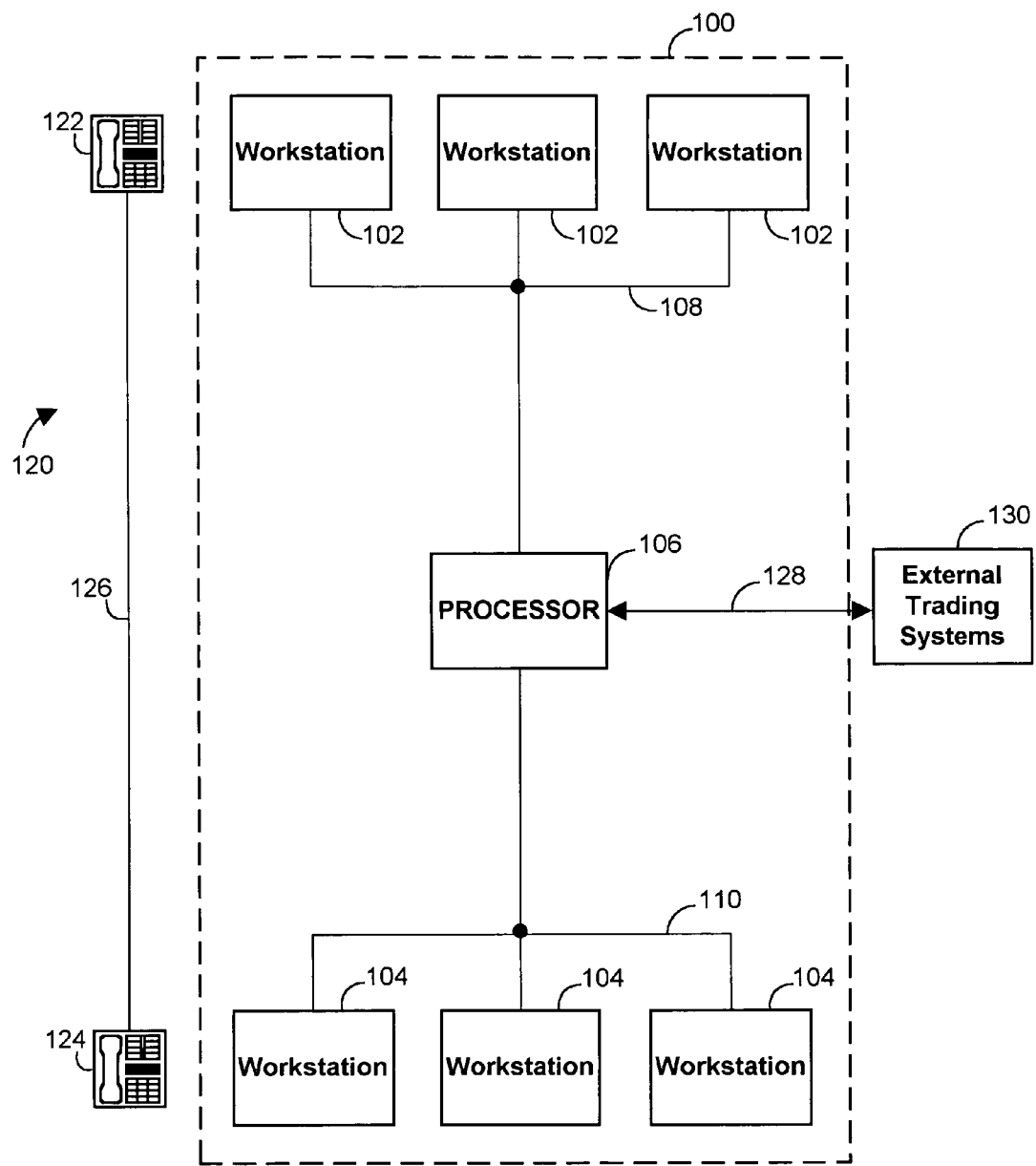
FIG. 1 is block diagram of hardware that may be used to implement one embodiment of the present invention.

Turning first to FIG. 1, an example of hardware 100 that may be used to implement one embodiment of the present invention is shown. As illustrated, hardware 100 may include one or more local workstations 102 and one or more remote workstations 104 that may be used by traders to view trading data and enter trading commands. Workstations 102 and 104 may be any suitable means for presenting data and, in preferred embodiments of this invention, accepting input. For example, workstations 102 and 104 may be personal computers, laptop computers, mainframe computers, dumb terminals, data displays, Internet browsers, Personal Digital Assistants (PDAs), two-way pagers, wireless terminals, portable telephones, etc., or any combination of the same.

To orchestrate trading between traders using workstations 102 and 104, the workstations preferably submit commands to, and receive data to be displayed from, a processor 106. In alternative embodiments, however, workstations may communicate with additional processors, or include processors to orchestrate trading in a distributed fashion without requiring processor 106. Processor 106, and any additional processors, may be any suitable circuitry or devices capable of processing data such as microprocessors, personal computers, network servers, mainframe computers, dedicated computer systems, etc.

As shown, processor 106 may be connected to workstations 102 and 104 by networks 108 and 110, respectively. Each of networks 108 and 110 may be any suitable data network for communicating data between workstations 102 and 104 and processor 106, such as a local area network, a wide area network, the Internet, an Intranet, a wireless network, a hard wired connection, a dial-up network, etc., or any combination of the same. In an arrangement of hardware 100 without processor 106, workstations 102 and 104 may be linked together by networks 108 and 110 directly.

As also shown in FIG. 1, a telephone network 120 may be provided that comprises a local telephone 122 and a remote telephone 124 connected by a telephone line 126. Telephone network 120 may be used to enable a trader at a remote location to communicate with an operator at a workstation 102 or 104. This may be useful when the trader does not have access to a workstation 102 or 104 or when the trader only has access to a display-only workstation 102 or 104. Obviously, telephone network 120 may be implemented as a private telephone network, a public telephone network, a wireless telephone network, or any suitable combination of the same.

In order to communicate with external trading systems 130, hardware 100 may include a network interface 128 that connects processor 106 to external trading systems 130. Network interface 128 may be any suitable interface and/or computer network that facilitates communication between processor 106 and external trading systems 130.

When used to implement a bid/offer, hit/take trading system as described above, hardware 100 may enable a trader to submit a bid to buy, or an offer to sell, an item at one of workstations 102 and 104. This bid or offer may then be communicated to processor 106, where the bid or offer can be ranked and stored in a bid-offer queue. The ranking may be based upon time of submission, price, or any other suitable criterion. The bid or offer may then be presented to other traders via other workstations 102 and 104 dependent upon its ranking in the bid-offer queue. Once displayed, the bid or offer can then be hit or taken by one or more of the other traders so that a trade of the item can proceed to execution. Alternatively, hardware 100 may be configured so that it does not operate as a trading system, but instead facilitates communication between traders and external trading systems 103, and performs the order linking functions described herein.

Figure 2A:
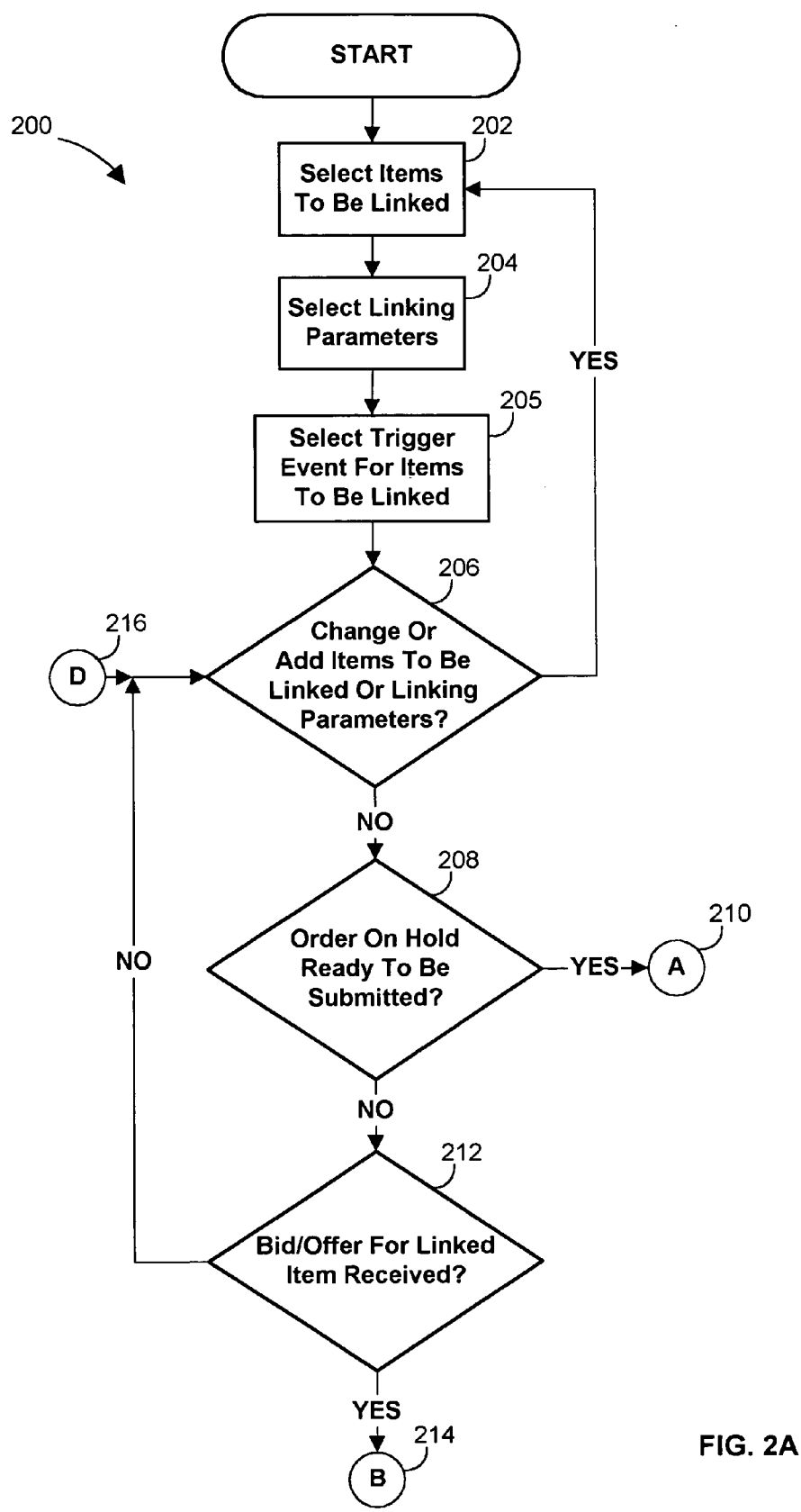
FIGS. 2A–2C are flow diagrams illustrating a linking process in accordance with one embodiment of the present invention.
Figure 2B:
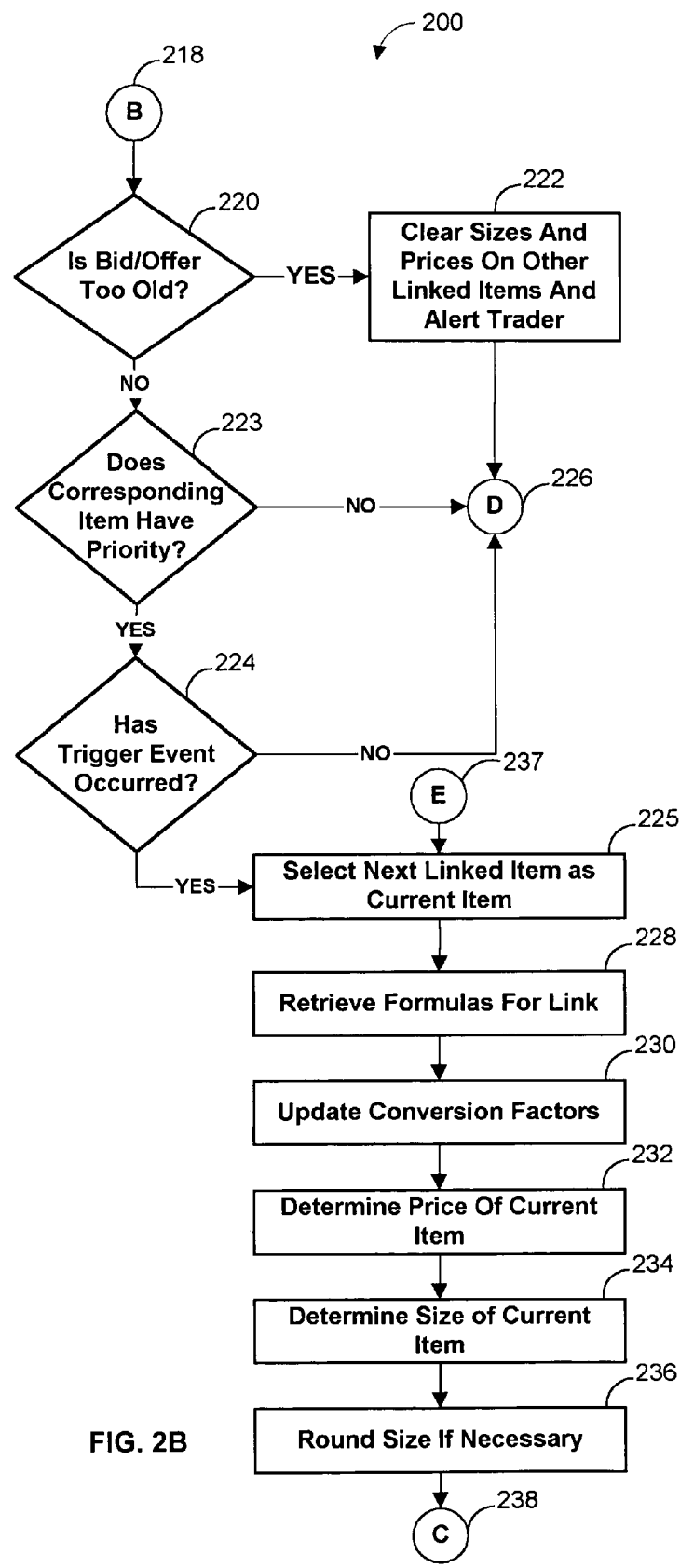
Figure 2C:
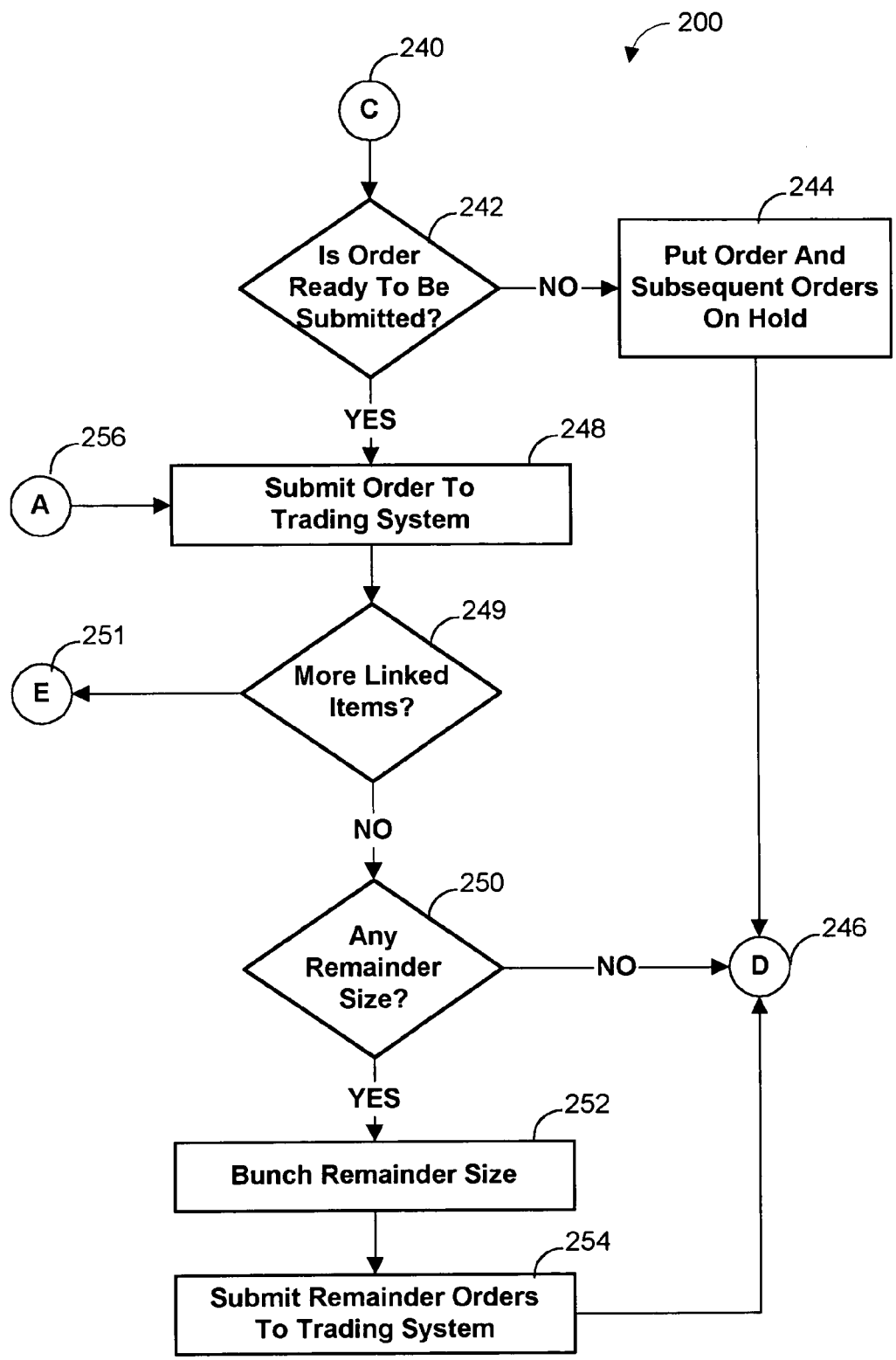

Turning to FIGS. 2A–2C, one embodiment of a linking process 200 that may be executed in processor 106 in accordance with the present invention is illustrated. As shown in FIG. 2A, once process 200 has begun, the process enables traders to select items to be linked at step 202. The linking of items may occur in the same market (e.g., only in the bond market) or in different markets (e.g., one in the bond market and another in the futures market) whether or not those different markets are related in any way. Similarly, items that are traded in different trading systems may be linked.

Figure 3:
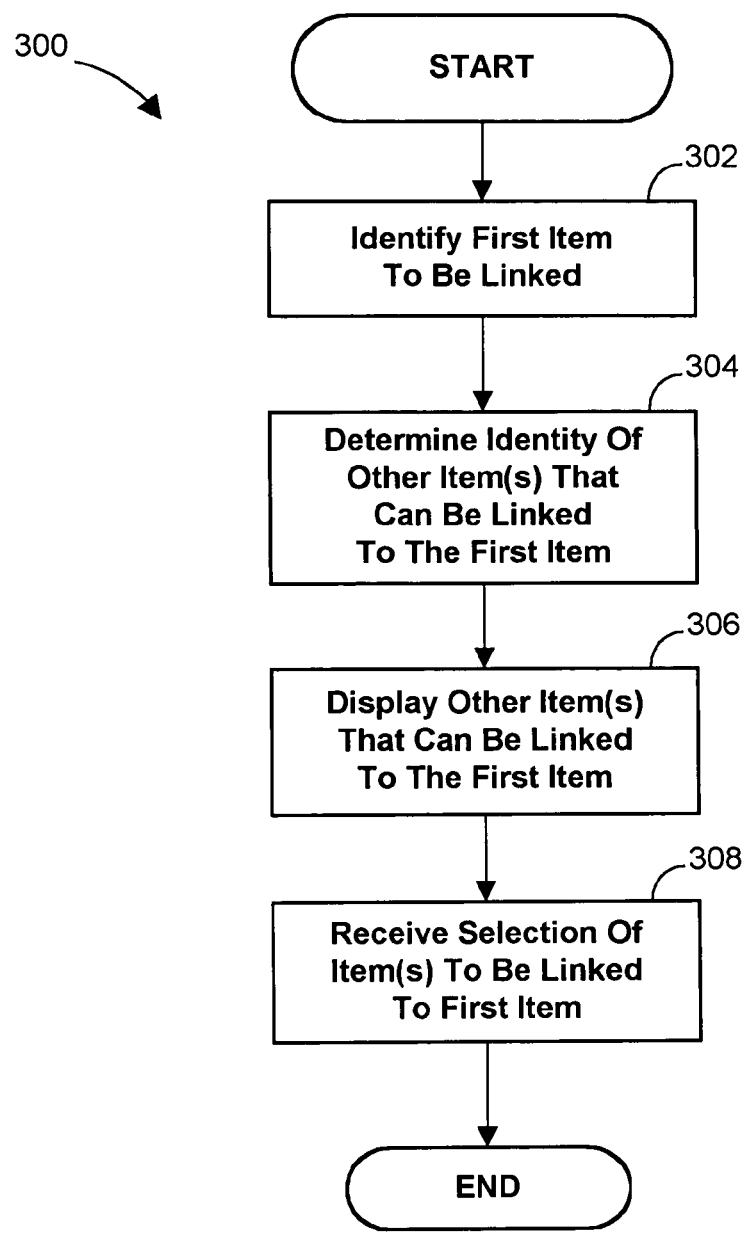
FIG. 3 is a flow diagram of an item selection process in accordance with one embodiment of the present invention.

One embodiment of an instrument linking process 300 that may be executed at step 202 in accordance with the present invention is illustrated in FIG. 3. As shown, process 300 initially allows a trader to identify a first item to be linked in the trading system at step 302. The trader may identify that the item is to be linked in any suitable fashion. For example, the trader may enter keystrokes on a workstation 102 or 104 (FIG. 1) which indicate that the trader would like to link a 10-year treasury bond. Alternatively, the trader may select the item from a graphical user interface that presents a menu of available items to be linked.

Next, at step 304, process 300 determines the identity of other instruments to which the first item identified at step 302 can be linked. This determination may be made by searching a database of items that are related to the first item, or in any other suitable manner. In the case where a trader has selected to link a 10-year treasury bond, for example, such a search may reveal that there are three different types of related futures contracts which are traded in two different markets (e.g., an 8% notional bond contract that is traded on the Chicago Board of Trade, an 8% notional bond contract that is traded on the Cantor Exchange, and a 6% notional bond contract that is traded on the Cantor Exchange). A possible linked trade involving such items could include buying the basis of the bond, that is, buying the bond on the cash market and selling an equivalent amount of futures contracts.

Once process 300 has identified other items that can be linked to the first item at step 304, process 300 creates a display listing the related instruments at step 306. An example of such a display 400 is illustrated in FIG. 4. Because the trader in the example underlying display 400 has selected to link a 10-year treasury bond, display 400 indicates two ways in which this bond can be linked—i.e., for basis trades and for spread trades (as indicated by rows 412 and 414). As stated above, a basis trade is one in which the trader buys a bond and sells a corresponding futures contract. A spread trade, on the other hand, is one in which the trader buys one bond and sells another.

As shown, display 400 contains five columns 402, 404, 406, 408, and 410 identifying the different items that can be linked. In the case of the exemplary 10-year treasury bond, this bond is available on the cash market as indicated by column 404, and three corresponding future contracts are available on the Chicago Board of Trade (CBOT 8%) and on the Cantor Exchange (CX 8% and CX 6%) as indicated by columns 406, 408, and 410. Because display 400 indicates that the bond can be linked for basis trades and spread trades, the display also indicates that the basis and the spread for this bond can be purchased on the direct market by column 402.

Referring back to FIG. 3, at step 308, process 300 next enables the trader to select the items that the trader wants to link. As shown in FIG. 4, this may be accomplished by placing "X's" in the grid formed by columns 402, 404, 406, 408, and 410 and rows 412 and 414. In the example illustrated in FIG. 4, the trader has linked the cash market for the bond with the direct market for the basis of the bond and the CX 6% market. The trader has also linked the cash market for the bond with the direct market for the spread of the bond.

Because the trader in this case has linked the direct market for the basis of the bond with the cash market for the bond and has linked the direct market for the spread of the bond with the cash market for the bond, preferred embodiments of the invention also transitively link the direct market for the basis of the bond to the direct market for the spread of the bond through the cash market for the bond.

Alternatively to determining items that can be linked to a first item and to displaying and selecting items that can be linked to the first item through an interface, as shown in steps 304, 306, and 308 of FIG. 3 and display 400 of FIG. 4, the present invention may be implemented in any other suitable fashion to enable a trader to specify items to be traded. For example, a trader may be permitted to specify particular items to be linked on a pair basis. Then to enable three items to be linked, the trader could simply link each of a first item and a second item with a third item. Because of the transitive linking aspect of the invention, the three items would then be linked. One way in which such a linking specification may be made is through the use of a command line entry mechanism wherein the trader may specify an identifier for a first bond and an identifier for a second bond to indicate the pair to be linked.

Referring back to FIG. 2A, once a trader has selected items to be linked at step 202, the trader is then permitted to select linking parameters for the linked items at step 204. In preferred embodiments of the invention, the trader is preferably permitted to select parameters that adjust the pricing of those items, sequence the placement of orders (i.e., bids, offers, hits, and takes) related to those items, indicate whether orders are to be placed automatically or manually, indicate whether there is to be a delay in the placement of orders for those items, and indicate the maximum frequency at which updates to orders for those items are to be placed.

Figure 5:
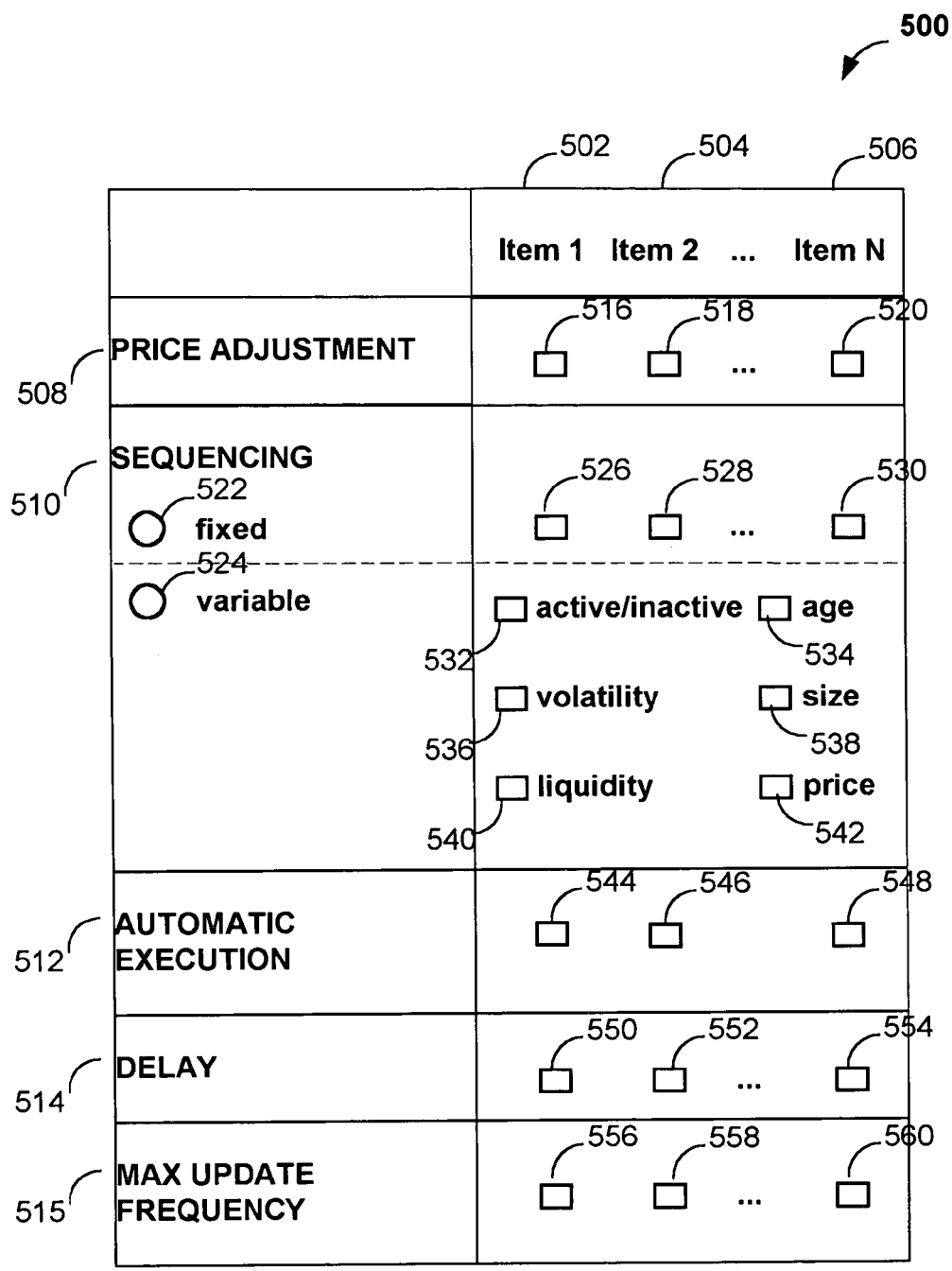
FIG. 5 is an illustration of a linking parameter specification interface in accordance with one embodiment of the present invention.

An example of an interface 500 for enabling a trader to make these settings is illustrated in FIG. 5. As shown, interface 500 indicates three items 502, 504, and 506. The number of items indicated in interface 500 may be any number and is preferably all of the items in a set of linked items. For the indicated items, interface 500 enables a trader to specify price adjustments, sequencing requirements, execution methods, order placement delays, and maximum update frequencies as indicated by rows 508, 510, 512, 514, and 515.

Price adjustments may be configured in interface 500 by specifying a number in fields 516, 518, or 520 that is to be added to the price of the corresponding item that may otherwise be determined by the linking engine as explained below. For example, if the trader is linking a bond and a futures contract for a basis trade, the trader may want to offer the futures contract at a higher price than the market value for that futures contract as calculated from the market value for the bond. In this case, the trader would indicate the increase in the offer price of the futures contract over market in the corresponding one of fields 516, 518, and 520.

Sequencing may be configured in interface 500 by first selecting one of a "fixed" radio button 522 and a "variable" radio button 524. Then, if radio button 522 is selected, the sequencing settings may be completed by filling in the numerical sequence of placement of orders in fields 526, 528, and 530. For example, in order to cause orders for item 2 to always be placed before orders for item 1, and orders for item 1 to always be placed before orders for item N, the numbers "1," "2," and "131" would be placed in fields 528, 526, and 530, respectively. Alternatively, if radio button 524 is selected, the sequencing settings may be completed by filling in the numerical sequence of priority in sorting that is to be performed in fields 532, 534, 536, 538, 540, and 542. For example, in order to cause placement orders to be based upon priority of age and size, a "1" would be placed in field 534 and a "2" would be placed in field 538. In this way, the items would be sorted first by age and then by size to determine sequence of order placement. By not filling in some of fields 532, 534, 536, 538, 540, and 542, sorting may be reserved to corresponding categories in the completed fields. Although particular categories to control variable sequencing are shown in FIG. 5 for the sake of illustration, any suitable categories may be used in accordance with the present invention.

In order to control whether orders are placed automatically or manually, the trader may select any of check boxes 544, 546, and 548 for the corresponding item 502, 504, and 506. For example, to cause item 502 to be executed automatically and item 504 and item 506 to be executed manually, the trader would select check box 544 and clear check boxes 546 and 548.

To set the delay to be applied to the placement of orders for items 502, 504, and 506, the trader may fill in fields 550, 552, and 554 with the appropriated delay period (e.g., 10 seconds). For example, if the trader wanted to cause the placement of orders for item 504 to be delayed by 1 minute, but orders for items 502 and 506 to be placed without delay, the trader would enter "60" in field 552 and leave fields 550 and 554 blank (or enter "0").

Finally, in order to indicate the maximum frequency at which updates to orders for items may be placed, a trader may fill in the maximum frequency for order updates in desired ones of fields 556, 558, and 560 for corresponding items 502, 504, and 506. For example, in order to limit order updates to once every ten seconds for item 504, the trader may enter "6" in field 558 to indicate a maximum of six updates per minute.

Although particular linking parameters are illustrated and discussed in connection with FIG. 5, any suitable set of linking parameters may be used in accordance with the present invention. Moreover, the linking parameters that are available may change dynamically as a function of the items that are selected to be linked. For example, when linking bonds to a corresponding futures contracts, hedge ratio linking parameters may be made available for specification by traders.

Turning back to FIG. 2A, once linking parameters have been specified at step 204, process 200 allows the trader to select a trigger event to be used to trigger linking of the linked items. Until the trigger event occurs, linking of the items is preferably not performed in accordance with the present invention. The trigger event may be the occurrence of a linked item having a certain price, size, yield, or any other characteristic, or rate of change of the same. Similarly, the trigger event may be the occurrence of two or more linked items having an average, a difference, a ratio, or any other suitable relationship in price, size, yield, rate of change of the same, etc. As yet another possibility, the trigger event may be only peripherally related or completely unrelated to any of the linked items. For example, the trigger event could be a market index reaching a certain value, a certain date having occurred, a certain business transaction closing, or an unlinked item in having a certain price, size, yield, etc. Naturally, any suitable interface may be utilized to enable the trader to select the trigger event.

Next, process 200 determines at step 206 if a trader wants to change or add items to be linked or linking parameters. If so, process 200 loops back to step 202. Otherwise, process 200 determines whether an on-hold order is ready to be submitted at step 208. An order may be on-hold if, for example, a delay was specified for submission of an order through interface 500 (FIG. 5). Similarly, an order may be on-hold if the sequencing parameter for the order (as configured in interface 500 (FIG. 5)) indicates that the order has not come up in the sequence for submission, if the order is to be manually submitted, or if the maximum update frequency for the corresponding item has been reached. If an on-hold order is ready to be submitted, process 200 then proceeds through links 210 and 256 (FIG. 2C) to step 248 (FIG. 2C). Otherwise, process 200 determines at step 212 whether a bid or offer for a linked item has been received. If not, process 200 loops back to step 206. Otherwise, process 200 proceeds through links 214 and 218 (FIG. 2B) to step 220 (FIG. 2B).

Turning to FIG. 2B, it can be seen that at step 220, process 200 next determines whether the received bid or offer is too old to support linking. Whether a bid or offer is too old may be based upon any suitable determination. For example, a system parameter may indicate that a bid or offer is too old to support linking when it has been outstanding for a given period of time. Alternatively, traders may be permitted to designate at what point a bid or offer becomes too old to support linking through an interface like interface 500 (FIG. 5). If the bid or offer is too old, then process 200, at step 222, clears the sizes and prices of other linked items that are based upon that bid or offer, and alerts traders that selected links involving the item corresponding to that bid or offer. Once the traders have been alerted at step 222, process 200 loops back to step 206 (FIG. 2A) via links 226 and 216 (FIG. 2A).

If the bid or offer is determined not to be too old at step 220, however, then process 200 determines at step 223 whether the item corresponding to the bid or offer has priority. Priority may be based on a test of which bid or offer in a set of linked items was bid or offered last, a test of the type of item (e.g., futures contract versus bond), or a test of the activity status of the item (e.g., active or inactive). Which of these tests determines whether an item has priority may be selected by a trader in a manner similar to selecting the sequencing order in interface 500 (FIG. 5). If the item does not have priority, process 200 loops back to step 206 (FIG. 2A) via links 226 and 216 (FIG. 2A).

If the bid or offer is determined to have priority at step 223, however, then process 200 determines at step 224 whether the trigger event has occurred for the linked items. As described above, any suitable trigger event may be used in accordance with the present invention. Naturally, process 200 must be able determine whether the trigger event did in fact occur, so suitable data is preferably provided to process 200 for this purpose. If the event is determined not to have occurred, then process 200 loops back to step 206 (FIG. 2A) via links 226 and 216 (FIG. 2A).

If the trigger event is determined to have occurred at step 224, however, then process 200 selects the next linked item (i.e., the item linked to the item corresponding to the bid or offer) as the current item at step 225 and retrieves formulas for linking the current item with the previous item (i.e., the item corresponding to the bid or offer) at step 228. For many pairs of items, there are known formulas for translating a size and a price of one item to a size and a price of another item. Any suitable formula, relationship, or mechanism for translating size and price of one item into that of another item may be used in accordance with the present invention. For example, when trading basis, the price of a bond may be related to the price of a futures contract using the following formula:

$$\text{Bond Cash Market Price} = \text{Basis} + \frac{\text{Futures}}{\text{Price}} \times \frac{\text{Conversion}}{\text{Factor}}$$

Alternatively, a price of one item may be calculated based upon a yield of another item. Similarly, when trading basis, the size of a bond bid or offer is related to the size of a futures contract bid or offer typically using the following formula:

$$\text{Bond Cash Market Price} = \frac{\text{Hedge}}{\text{Ratio}} \Big/ \frac{\text{Futures}}{\text{Market Size}}$$

While conversion factors are published by the exchanges and data vendors, they need to be updated dynamically as issues mature and new contracts become open to trading. Process 200 dynamically updates these conversion factors at step 230 so that any financial instrument, including instruments that are not eligible for delivery, have current conversion factors for generating appropriate market accepted weightings for combination bidding and offering and buying and selling.

In the case where there are no standard formulas for translating the size and the price of an order for one item into a size and a price for order for another item, the trader may be permitted to specify a relationship through a suitable interface, or the trading system may use historical data relating to the items to estimate a relationship.

Next, process 200 determines the price of the order for the current item at step 232 and the size of the order for the current item at step 234 using the retrieved formulas. In addition to calculating the size of the order using a formula, due to restrictions on trading of certain items that require that those items be traded in specified minimum lot sizes (or a multiple thereof), process 200 may also round the size of the order for the item to a corresponding lot size (or a multiple thereof) at step 236. For example, U.S. treasuries are typically traded in sizes that are multiples of one million dollars. In the event that a sizing formula indicates that a bid size for a bond should be $1.1 million based upon another trader's available bid for a linked futures contract, the bid size for the bond may be rounded to $1 million to conform to the lot size requirements. Once step 236 has been performed, process 200 proceeds from step 236 through links 238 and 240 (FIG. 2C) to step 242 (FIG. 2C).

Alternatively, a trader may be permitted to specify absolute values for the price and size of an item when linking items rather than specifying a formula or formulas relating the item to another item. In such a case steps 228 and 230 of process 200 may be skipped.

As shown in FIG. 2C, at step 242, process 200 determines if the order for the current item is ready to be submitted. An order may not be ready to be submitted if an order submission delay was specified through interface 500 (FIG. 5). Similarly, an order may be not be ready to be submitted if the sequencing parameter for the order (as configured in interface 500 (FIG. 5)) indicates that the order has not come up in the sequence for submission, if the order is to be manually submitted, or if the maximum update frequency for the corresponding item has been reached. In the event that an order is not ready to be submitted, process 200 then puts the order and subsequent orders for items that are linked to the current item on hold at step 244. Once the orders have been put on hold, process 200 loops back to step 206 (FIG. 2A) through links 246 and 216 (FIG. 2A).

If the order is ready to be submitted, however, process 200 then submits the order to a trading system at step 248. As explained above in connection with FIG. 1, this trading system may be implemented as part of hardware 100 or may be implemented in an external trading system 130 connected to hardware 100.

In preferred embodiments of the present invention, trading systems may enable process 200 to briefly lock the trading systems so that all of the orders for a set of linked items can be submitted without interference from external sources in response to a new bid or offer.

After process 200 has submitted the order, the process determines at step 249 if there are more linked items in the set of linked items containing the item corresponding to the received bid or offer. If so, then process 200 loops back to step 225 (FIG. 2B) via links 251 and 237 (FIG. 2B).

Using formulas, relationships, or mechanisms between transitively linked items, sizing and pricing of items can propagate through a chain of linked items in order to price one item from an otherwise un-associated item. For example, assume that an item A is linked to an item B, and the item B is linked to an item Z. If a size and a price are available for item A, that size and that price may be used to determine a size and a price for item B. Then using the determined size and the determined price for item B, a size and a price may be determined for item Z. This chaining of links could be used for any number of linked items.

If process 200 determines that there are no more linked items in a set of linked items at step 22, process 200 then proceeds to step 250 to determine if there is any remainder size from the rounding of the order sizes at step 236 (FIG. 2B). For example, in connection with the example given above where an order for a bond is rounded from a size of $1.1 million to $1 million, a remainder order may have a size of $0.1 million. Similarly, if a size is rounded up, there may be a remainder size for the over-order. For example, if a hit order is rounded up from $0.9 million to $1.0 million, a bid or lift remainder order may need to be submitted for the $0.1 remainder size.

If there is remainder size, process 500 then bunches the remainder sizes for separate trading at step 252 and submits the remainder orders to a suitable trading system for trading the remainder size at step 254. Once the remainder orders have been submitted, or if there is no remainder size, then process 200 loops back to step 206 (FIG. 2A) via links 246 and 216 (FIG. 2A).

Those skilled in the art will appreciate that the present invention can be practiced by other than the described embodiments, which are presented for purposes of illustration and not of limitation, and the present invention is limited only by the claims.

What is claimed is:

1. A method for linking items in an electronic trading system, comprising:
   operating a network server to communicate with a plurality of workstations and to receive bids and offers for at least one item from at least one of the plurality of workstations, wherein at least one of a group consisting of 1) at least one of the plurality of workstations and 2) the network server, is adapted for:
   receiving a selection of a first item in a first market;
   receiving a selection of a second item in a second market;
   receiving at least one linking parameter that defines a relationship between the first item and the second item;
   receiving order information for an order for the first item;
   propagating order information for an order for the second item in the second market, the order information for the second item being based upon the order information for the first item and the linking parameter; and
   in response to identifying an order that matches at least a portion of the order for the second item, executing at least a portion of the order for the second item and propagating and executing a matching order for the first item, the matching order for the first item matching at least a portion of the order for the first item,
   in which the executing at least a portion of the order for the second item and propagating and executing a matching order for the first item occurs independent of interference from external sources, said interference comprising a new bid or a new offer.

2. A method for linking items in an electronic trading system, comprising:
   operating a network server to communicate with a plurality of workstations and to receive bids and offers for at least one item from at least one of the plurality of workstations, wherein at least one of a group consisting of 1) at least one of the plurality of workstations and 2) the network server, is adapted for:
   receiving a selection of a first item in a first market;
   receiving a selection of a second item in a second market;
   receiving at least one linking parameter that defines a relationship between the first item and the second item;
   receiving order information for an order for the first item;
   propagating order information for an order for the second item in the second market, the order information for the second item being based upon the order information for the first item and the linking parameter; and
   in response to identifying an order that matches at least a portion of the order for the second item,
   locking the trading system with respect to the matching order for the second item, the locking to provide time to identify whether a matching order exists for the first item and the locking that comprises allowing the orders for the first item and for the second item to be submitted without interference from external sources, said interference comprising a new bid or a new offer.

3. The method of claim 2, the locking further comprising preventing the matching order for the second item from being matched with an order other than the second order or cancelled.

4. The method of claim 2, the locking further comprising executing at least a portion of the matching order for the second item and at least a portion of the order for the first item.

5. The method of claim 1, further comprising attempting to substantially simultaneously execute the matching order for the first item and the order for the second item, the attempting occurring at a predetermined frequency.

6. The method of claim 2, wherein the method further comprises:
   after a predetermined time from the receipt of the matching order for the second item, canceling the order for the second item.

7. The method of claim 1, wherein the linking parameter specifies a maximum update frequency for the order for the second item.

8. The method of claim 1, wherein the propagating comprises using a formula to relate the order information for the second item to the order information for the first item.

9. The method of claim 8, the formula further comprising determining a conversion factor that is used in the formula.

10. The method of claim 8, further comprising determining a hedge ratio that is used in the formula.

11. The method of claim 8, further comprising determining the price of the order for the second item based on the price of the order information for the first item.

12. The method of claim 8, further comprising determining the size of the order for the second item based on the size of the order information for the first item.

13. The method of claim 1, further comprising determining if the order information for the first item is too old to be used for linking the first item to the second item.

14. The method of claim 1 further comprising:
   receiving a selection of a third item;
   receiving a second linking parameter; and
   propagating an order for a third item in a third market based on the order information for the first item, the order for the second item, the first linking parameter, and the second linking parameter; and
   in response to a new bid or new offer, substantially simultaneously executing the order for the first item, the order for the second item, and the order for the third item.

15. A method for linking items in an electronic trading system, comprising:
   operating a network server to communicate with a plurality of workstations and to receive bids and offers for at least one item from at least one of the plurality of workstations, wherein at least one of a group consisting of 1) at least one of the plurality of workstations and 2) the network server, is adapted for:
   receiving a selection of a first item in a first market;
   receiving a selection of a second item in a second market;
   receiving at least one linking parameter that defines a relationship between the first item and the second item;
   receiving order information for an order for the first item;
   propagating an order for the second item in the second market, the order for the second item being based upon the order information for the first item and the linking parameter; and
   in response to a bid or offer, executing at least a portion of the order for the second item and propagating and executing a matching order for the first item, the matching order for the first item matching at least a portion of the order for the first item, when the matching order for the first item and the order for the second item can be executed independent of interference from external sources, the interference from external sources comprising a new bid or a new offer.

16. The method of claim 15, wherein the executing the matching order for the first item and the order for the second item comprises:
   locking the trading system with respect to the matching order for the second item, the locking to provide time to identify whether a matching order exists for the first item.

17. The method of claim 16, the locking further comprising preventing the matching order for the second item from being matched with an order other than the second order or cancelled.

18. The method of claim 15, where the executing the matching order for the first item and the order for the second item comprises:
   determining whether a substantially simultaneous execution of the matching order for the first item and the order for the second item can occur, and if the substantially simultaneous execution of the matching order for the first item and the order for the second item can occur, executing the trade for the matching order for the first item and for the second item.

19. The method of claim 18, further comprising attempting to substantially simultaneously execute the matching order for the first item and the order for the second item, the attempting occurring at a predetermined frequency.

20. The method of claim 15, wherein the linking parameter specifies a maximum update frequency for the matching order for the first item and the order for the second item.

21. The method of claim 15, wherein the propagating comprises using a formula to relate the order for the second item to the order information for the first item.

22. The method of claim 21, the formula further comprising determining a conversion factor that is used in the formula.

23. The method of claim 21, further comprising determining a hedge ratio that is used in the formula.

24. The method of claim 21, further comprising determining the price of the order for the second item based on the price in the order information for the first item.

25. The method of claim 21, further comprising determining the size of the order for the second item based on the price in the order information for the first item.

26. The method of claim 15, further comprising determining if the order information for the first item is too old to be used for linking the first item to the second item.

27. The method of claim 15 further comprising:
   receiving a selection of a third item;
   receiving a second linking parameter; and
   propagating an order for a third item in a third market based on the order information for the first item, the order for the second item, the first linking parameter, and the second linking parameter; and
   in response to a new bid or new offer, substantially simultaneously executing the order for the first item, the order for the second item, and the order for the third item only when the orders can be executed simultaneously.

28. A method for linking items in an electronic trading system, the linking specifying a price adjustment between a first order and a second order, the method comprising:
   operating a network server to communicate with a plurality of workstations and to receive bids and offers for at least one item from at least one of the plurality of workstations, wherein at least one of a group consisting of 1) at least one of the plurality of workstations and 2) the network server, is adapted for:
- receiving an order for a first item in a first market;
- receiving an order for a second item in a second market, the second order being received after the first order; and
- executing an order that matches at least a portion of the order for the first item and an order that matches at least a portion of the order for the second item only when the matching orders can be executed independent of interference from external sources, said interference comprising a new bid or a new offer.

29. The method of claim 28, further comprising attempting to substantially simultaneously execute the order for the first item and the order for the second item, the attempting occurring at a predetermined frequency.

30. The method of claim 28, where the executing the order for the first item and the order for the second item comprises:
- after a predetermined time from the receipt of the order for the second item, canceling the matching order for the first item and the matching order for the second item.

31. The method of claim 1, further comprising performing the executing at least a portion of the order for the second item and propagating and executing the matching order for the first item when the matching order for the first item and the order for the second item can be executed substantially simultaneously.

32. The method of claim 2, further comprising, if a matching order does not exist for the first item, canceling the order for the second item.

33. The method of claim 15, further comprising, if a matching order does not exist for the first item, canceling the order for the second item.

34. A computer readable medium having program code recorded thereon, the program code for execution on a computer and for linking items in one or more electronic computer trading systems, the program code comprising:
- a first program code for receiving a determination of a first item in a first electronic market;
- a second program code for receiving a determination of a second item in a second electronic market;
- a third program code for receiving one or more linking parameters for defining a relationship between the first item and the second item;
- a fourth program code for automatically monitoring order information for the first item;
- a fifth program code for deriving via a computer process at least one of a price and size for the second item based on the linking parameters and the order information for the first item; and
- a sixth program code for submitting a bid, offer, buy or sell order for the second item in the second market, the submitting being based on the one or more linking parameters and the order information for the first item, the submitting a bid, offer, buy or sell order for the second item in the second market occurring when the submitting can occur independent of interference from external sources, said interference comprising a new bid or a new offer.

35. The computer readable medium of claim 34 further comprising a seventh program code comprising, when the automatically monitoring determines a change in the order information for the first item, canceling the order for the second item.

36. The computer readable medium of claim 34 further comprising a seventh program code comprising, when the automatically monitoring determines a change in the order information for the first item, canceling the order for the second item and resubmitting the order for the second item at a different price or size.

37. The computer readable medium of claim 34 further comprising a seventh program code for electronically rounding the size of the order for the second item to a multiple of a specified minimum lot size.

38. The computer readable medium of claim 34 further comprising a seventh program code for electronically canceling the order for the second item when the order information for the second item is outstanding for a pre-determined period of time.

39. A computer readable medium having program code recorded thereon, the program code for execution on a computer and for linking items in one or more electronic computer trading systems, the program code comprising:
- a first program code for receiving a determination of a first item in a first electronic market;
- a second program code for receiving a determination of a second item in a second electronic market;
- a third program code for receiving one or more linking parameters for defining the relationship between the first item and the second item;
- a fourth program code for automatically monitoring order information for the first item;
- a fifth program code for deriving via a computer process at least one of a price and size for the second item based on the linking parameters and the order information for the first item;
- a sixth program code for submitting a bid, offer, buy or sell order for the second item in the second market, the submitting being based on the one or more linking parameters and the order information for the first item; and
- a seventh program code for automatically submitting a bid, offer, buy or sell order for the first item based on the one or more linking parameters when at least a portion of the order for the second item has been executed, the submitting a bid, offer, buy or sell order for the first item in the first market occurring when the submitting can occur independent of interference from external sources, said interference comprising a new bid or a new offer.

40. The computer readable medium of claim 39, further comprising an eighth program code for, when the automatically monitoring determines a change in the order information for the first item, canceling the order for the second item prior to execution of at least a portion of the order for the second item.

41. The computer readable medium of claim 39, further comprising an eighth program code for, when the automatically monitoring determines a change in the order information for the first item, canceling the order for the second item prior to execution of at least a portion of the order for the second item and resubmitting the order for the second item at a different price or size.

42. The computer readable medium of claim 39, further comprising an eighth program code for, prior to execution of at least a portion of the order for the second item, electronically rounding the size of the order for the second item to a multiple of a specified minimum lot size.

43. The computer readable medium of claim 39, further comprising an eighth program code for electronically canceling the order for the second item prior to execution of at least a portion of the order for the second item when the order information for the second item is outstanding for a pre-determined period of time.

44. A method for implementing on a computer system, the method for trading a first item and a second item in one or more electronic trading systems, the method comprising:
receiving a determination of a first item in a first electronic market;
receiving a determination of a second item in a second electronic market;
receiving one or more linking parameters for defining a relationship between the first item and the second item;
electronically monitoring order information for the first item;
deriving via a computer process at least one of a price and size for the second item based on the linking parameters and the order information for the first item; and
submitting a bid, offer, buy or sell order for the second item in the second market, the submitting being based on the one or more linking parameters and the order information for the first item, the submitting a bid, offer, buy or sell order for the second item in the second market occurring when the submitting can occur independent of interference from external sources, said interference comprising a new bid or a new offer.

45. The method of claim 44 further comprising, when the automatically monitoring determines a change in the order information for the first item, canceling the order for the second item prior to execution of at least a portion of the order for the second item.

46. The method of claim 44 further comprising, when the automatically monitoring determines a change in the order information for the first item, canceling the order for the second item prior to execution of at least a portion of the order for the second item and resubmitting the order for the second item at a different price or size.

47. The method of claim 44 further comprising electronically rounding the size of the order for the second item to a multiple of a specified minimum lot size prior to execution of at least a portion of the order for the second item.

48. The method of claim 44 further comprising electronically canceling the order for the second item prior to execution of at least a portion of the order for the second item when the order information for the second item is outstanding for a pre-determined period of time.

49. A method for implementing on a computer system, the method for trading a first item and a second item in one or more electronic trading systems, the method comprising:
a display device that displays information relating to the first item and the second item;
a trade order submitting component for:
receiving a determination of a first item in a first electronic market;
receiving a determination of a second item in a second electronic market;
receiving one or more linking parameters for defining a relationship between the first item and the second item;
automatically monitoring order information for the first item;
deriving via a computer process at least one of a price and size for the second item based on the linking parameters and the order information for the first item;
submitting a bid, offer, buy or sell order for the second item in the second market, the submitting being based on the one or more linking parameters and the order information for the first item; and
automatically submitting a bid, offer, buy or sell order for the first item based on the one or more linking parameters when at least a portion of the order for the second item has been executed, the submitting a bid, offer, buy or sell order for the first item in the first market occurring when the submitting can occur independent of interference from external sources, said interference comprising a new bid or a new offer.

50. The method of claim 49 further comprising, when the automatically monitoring determines a change in the order information for the first item, canceling the order for the second item prior to execution of at least a portion of the order for the second item.

51. The method of claim 49 further comprising, when the automatically monitoring determines a change in the order information for the first item, canceling the order for the second item prior to execution of at least a portion of the order for the second item and resubmitting the order for the second item at a different price or size.

52. The method of claim 49 further comprising electronically rounding the size of the order for the second item to a multiple of a specified minimum lot size prior to execution of at least a portion of the order for the second item.

53. The method of claim 49 further comprising electronically canceling the order for the second item when the order information for the second item is outstanding for a pre-determined period of time prior to execution of at least a portion of the order for the second item.

* * * * *